United States Patent [19]

Bryan et al.

[11] Patent Number: 4,966,202
[45] Date of Patent: Oct. 30, 1990

[54] SHAPE RETENTION HOSE CONSTRUCTION

[75] Inventors: James S. Bryan, Clyde, N.C.; James B. Rush, Springfield, Mo.

[73] Assignee: Dayco Products, Inc., Dayton, Ohio

[21] Appl. No.: 270,990

[22] Filed: Nov. 14, 1988

[51] Int. Cl.$^5$ .................. F16L 11/14; F16L 57/00
[52] U.S. Cl. ..................... 138/172; 138/103; 138/109; 138/122; 138/139; 138/173; 138/DIG. 8
[58] Field of Search ............... 138/109, 103, 121, 122, 138/172, 139, 173, 174, 178, DIG. 8, 134

[56] References Cited

U.S. PATENT DOCUMENTS

| | | | |
|---|---|---|---|
| 28,647 | 6/1860 | Butler | 138/139 X |
| 529,216 | 11/1894 | Tatham | 138/139 |
| 3,015,133 | 1/1962 | Nichols | 138/139 |
| 3,330,303 | 7/1967 | Fochler | 138/121 |
| 3,332,446 | 7/1967 | Mann | 138/122 |
| 3,402,741 | 9/1968 | Yurdin | 138/118 |
| 3,847,184 | 11/1974 | Grod | 138/DIG. 8 |
| 4,147,185 | 4/1979 | Hines | 138/121 |
| 4,214,147 | 7/1980 | Kraver | 138/121 |
| 4,236,509 | 12/1980 | Takahashi et al. | 138/134 |
| 4,295,496 | 10/1981 | Bixby | 138/122 |
| 4,307,756 | 12/1981 | Voight et al. | 138/139 |
| 4,327,775 | 5/1982 | Tally | 138/103 |
| 4,456,034 | 6/1984 | Bixby | 138/122 |
| 4,463,779 | 8/1984 | Wink et al. | 138/125 |
| 4,683,917 | 8/1987 | Bartholomew | 138/173 |

Primary Examiner—James E. Bryant, III
Attorney, Agent, or Firm—Joseph V. Tassone

[57] ABSTRACT

A shape retention hose construction and method of making the same are provided, the hose construction comprising a length of flexible tubular hose formed mainly of polymeric material and having opposite end portions and an intermediate body portion that defines internal and external peripheral surfaces of said hose, and a shape retention unit carried by the hose and being adapted to generally retain the shape of the hose construction when the hose and its carried shape retention unit are jointly bent into a particular shape, the shape retention unit comprising a deformable tubular member having opposed ends and a continuous sidewall between the ends that defines an internal and external peripheral surface of the tubular member, the hose and tubular member being telescoped together with the surfaces of the tubular member being disposed closely adjacent the surfaces of the hose.

6 Claims, 3 Drawing Sheets

U.S. Patent  Oct. 30, 1990  Sheet 1 of 3  4,966,202
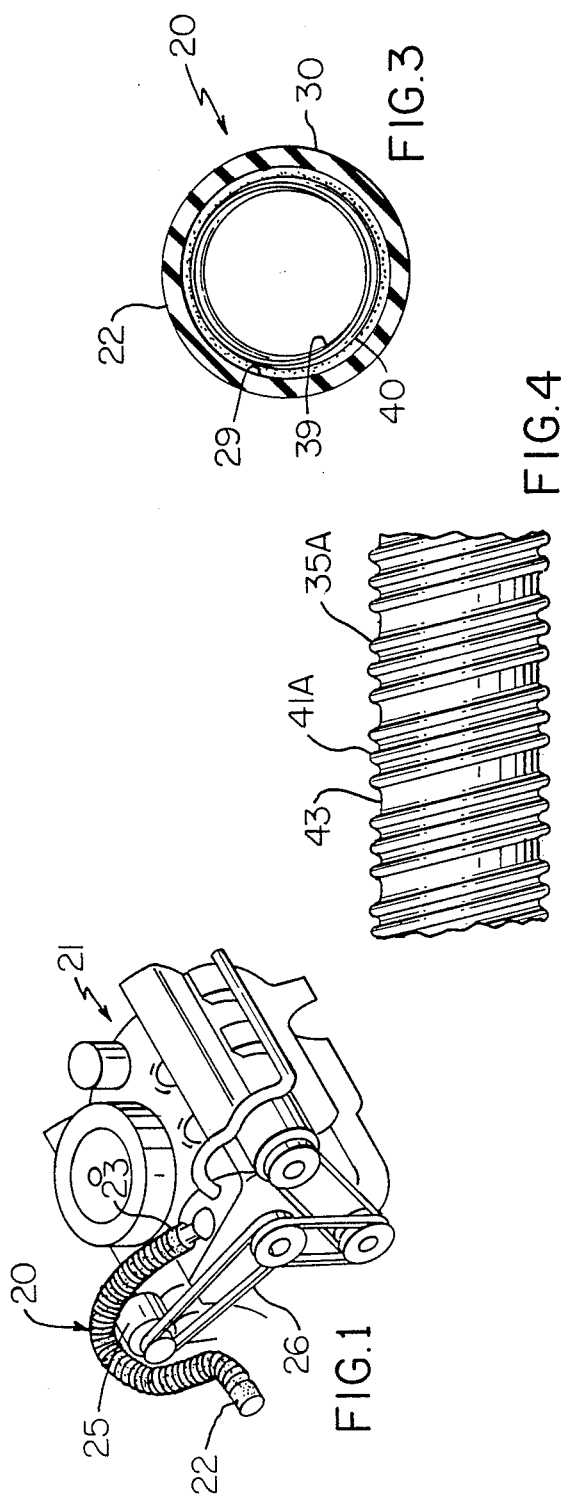
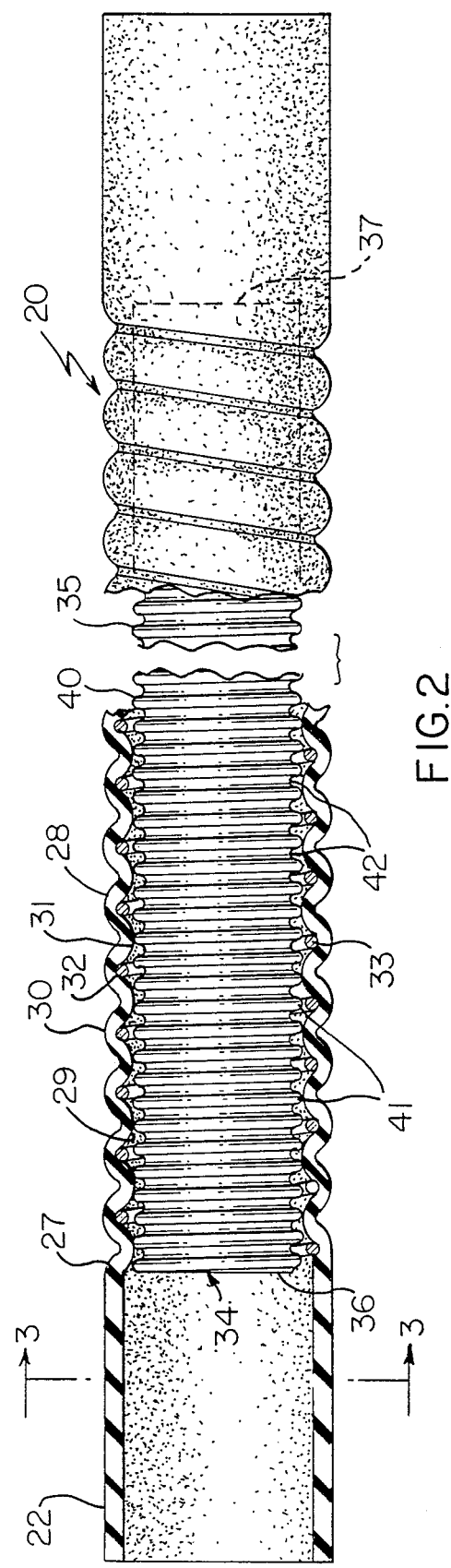

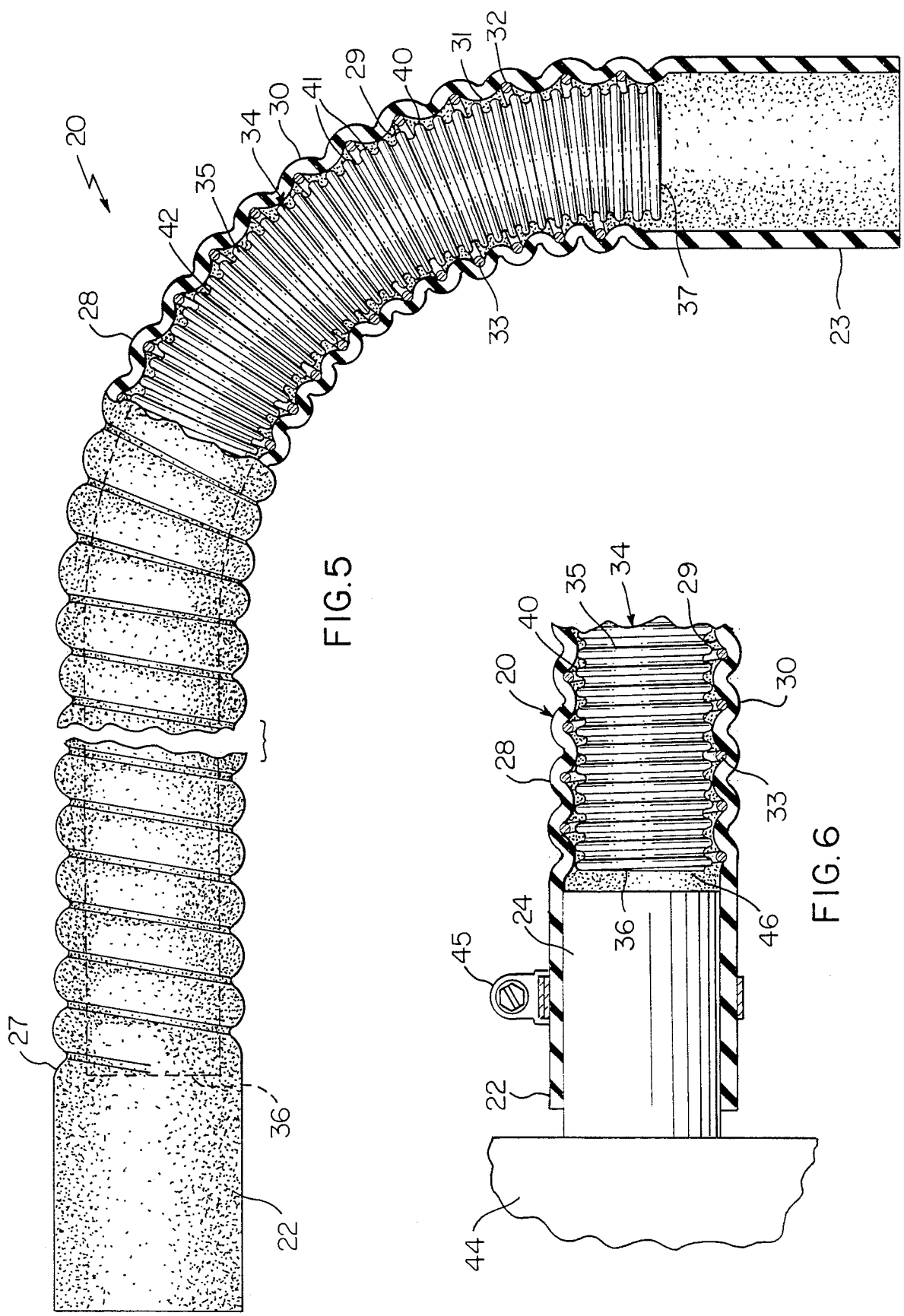

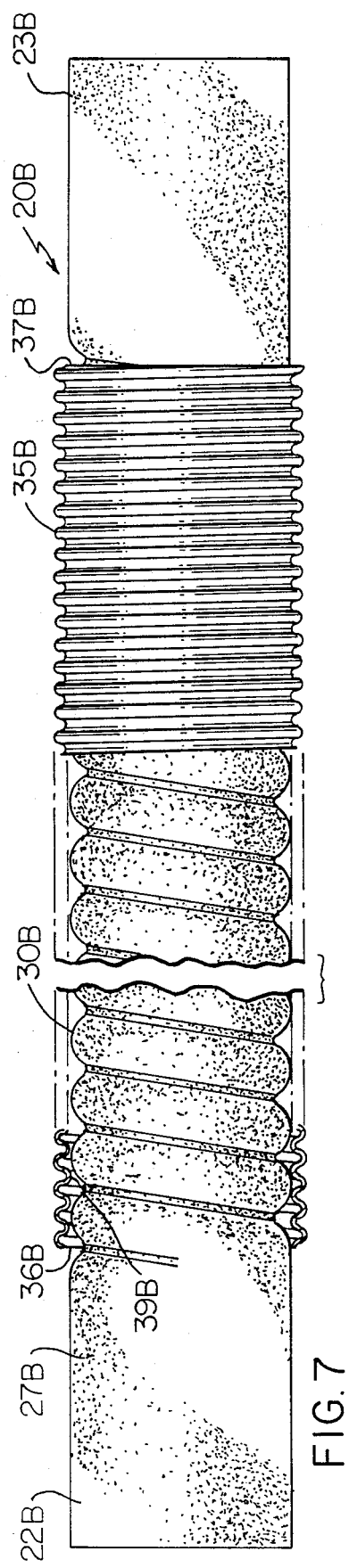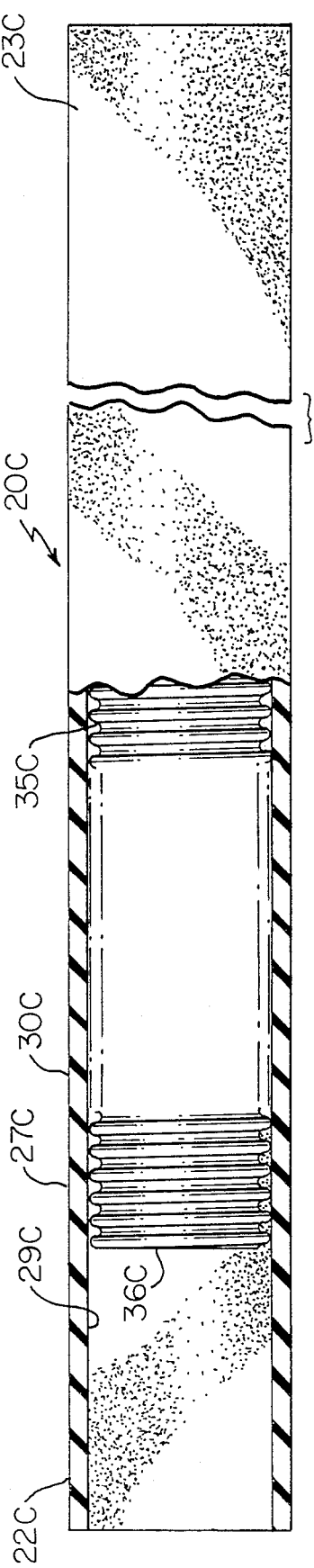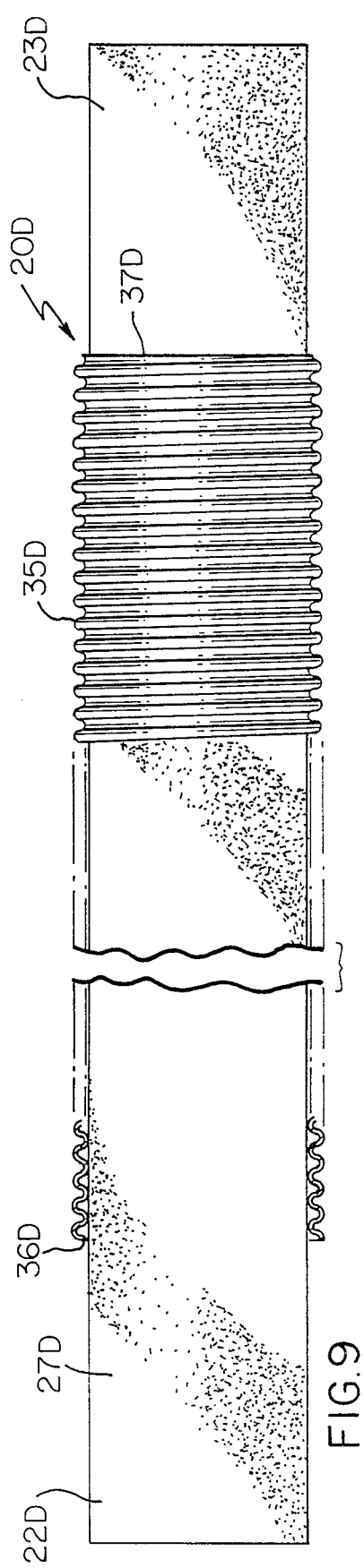

SHAPE RETENTION HOSE CONSTRUCTION

BACKGROUND OF THE INVENTION

1. Field of the Invention

This invention relates to a new shape retention hose construction and to a new method of making such a hose construction.

2. Prior Art Statement

It is known to provide a shape retention hose construction comprising a length of flexible tubular hose formed mainly of polymeric material and having opposite end portions and an intermediate body portion that defines internal and external peripheral surface means of the hose, and shape retention means carried by the hose and being adapted to generally retain the shape of the hose construction when the hose and its carried shape retention means are jointly bent into a particular shape. For example, see the U.S. Pat. No. to Yurdin, 3,402,741; the U.S. Pat. No. to Bixby, 4,295,496; the U.S. Pat. No. to Tally, 4,327,775; the U.S. Pat. No. to Bixby, 4,456,034 and the U.S. Pat. No. to Wink et al, 4,463,779.

SUMMARY OF THE INVENTION

It is one feature of this invention to provide a new shape retention hose construction with unique shape retention means carried by the flexible hose thereof so that the resulting hose construction can be bent into a particular shape thereof and generally retains that shape.

In particular, it was found according to the teachings of this invention that the shape retention means of a shape retention hose construction can comprise a deformable tubular member that has opposed ends and a continuous sidewall means between those ends, such tubular member being adapted to be disposed in telescoped relation with a flexible hose so as to retain the particular shape of the resulting hose construction when the same is bent into that particular shape.

For example, one embodiment of this invention provides a shape retention hose construction that comprises a length of flexible tubular hose formed mainly of polymeric material and having opposite end portions and an intermediate body portion that defines internal and external peripheral surface means of the hose, and shape retention means carried by the hose and being adapted to generally retain the shape of the hose construction when the hose and its carried shape retention means are jointly bent into a particular shape, the shape retention means comprising a deformable tubular member having opposed ends and a continuous sidewall means between the ends that defines internal and external peripheral surface means of the tubular member, the hose and tubular member being telescoped together with the surface means of the tubular member being disposed closely adjacent the surface means of the hose.

Accordingly, it is an object of this invention to provide a new shape retention hose construction having one or more of the novel features of this invention as set forth above or hereinafter shown or described.

Another object of this invention is to provide a new method of making a shape retention hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a top perspective view of an internal combustion engine for a transportation vehicle or the like and utilizing the shape retention hose construction of this invention.

FIG. 2 is an enlarged view of the shape retention hose construction of FIG. 1 in the unbent condition thereof, FIG. 2 being partially in cross section and partially broken away to illustrate the parts thereof in elevation.

FIG. 3 is a cross-sectional view taken on line 3—3 of FIG. 2.

FIG. 4 is a fragmentary side view of another form of the shape retention tubular member of this invention.

FIG. 5 is a view similar to FIG. 2 and illustrates the hose construction of this invention bent into a particular shape thereof, FIG. 5 being partially in elevation and partially in cross section.

FIG. 6 is a fragmentary view illustrating the hose construction of FIG. 3 being mounted to a radiator horn of the engine of FIG. 1, FIG. 6 being partially in cross section.

FIG. 7 is a view similar to FIG. 2 and illustrates another shape retention hose construction of this invention.

FIG. 8 is a view similar to FIG. 2 and illustrates another shape retention hose construction of this invention.

FIG. 9 is a view similar to FIG. 2 and illustrates another shape retention hose construction of this invention.

DESCRIPTION OF THE PREFERRED EMBODIMENTS

While the various features of this invention are hereinafter illustrated and described as being particularly adapted to provide a hose construction for use with the cooling system of an internal combustion engine, it is to be understood that the various features of this invention can be utilized singly or in various combinations thereof to provide a hose construction for other structures as desired.

Therefore, this invention is not to be limited to only the embodiments illustrated in the drawings, because the drawings are merely utilized to illustrate one of the wide variety of uses of this invention.

Referring now to FIGS. 1, 2, 3, 5 and 6, a new shape retention hose construction of this invention is generally indicated by the reference numeral 20 and is illustrated in FIG. 1 as being utilized as part of the cooling system of an internal combustion engine that is generally indicated by the reference numeral 21, the hose construction 20 being illustrated in FIG. 1 as having been bent into a particular shape so that the opposed end means or portions 22 and 23 thereof can be interconnected to the desired tubular coupling means of the engine 21, such as to the tubular radiator horn 24, FIG. 6, in a manner hereinafter set forth, so that the bent hose construction can avoid engine components that would normally be disposed in the path thereof, such as component 25 and its associated belt means 26, all for reasons well known in the art. For example, see the aforementioned five U.S. patents, namely, the U.S. Pat. No. to Yurdin, 3,402,741; the U.S. Pat. No. to Bixby, 4,295,496; the U.S. Pat. No. to Tally, 4,327,775; the U.S. Pat. No. to Bixby, 4,456,034 and the U.S. Pat. No. to Wink et al, 4,463,779 whereby these five patents are being incorporated into this disclosure by this reference thereto.

Since the reasons for providing a shape retention hose construction are well known in the art, only the details of the new shape retention hose constructions of this invention will now be set forth.

The hose construction 20 of this invention comprises a length of flexible tubular hose 27 formed mainly of polymeric material and having the opposite end portions 22 and 23 and an intermediate body portion 28 that defines an internal peripheral surface means 29 of the hose 27 and an external peripheral surface means 30 of the hose 27, the body portion 28 of the hose 27 being corrugated in a helical manner that is well known in the art so as to define a plurality of crests 31 and valleys 32 in the internal peripheral surface 29 that is adapted to readily receive a helically wound reinforcing wire 33 in the valleys 32 thereof in a conventional manner. Thus, the corrugations in the body portion 28 of the hose 27 renders the same relatively flexible and the wire 33 prevents collapse of the hose 27 under vacuum conditions therein as is well known in the art.

The hose construction 20 of this invention also includes a shape retention means that is generally indicated by the reference numeral 34 and comprises a tubular member 35 having opposed ends 36 and 37 and a continuous sidewall means 38 between the ends 36 and 37 that defines an internal peripheral surface means 39 (FIG. 3) of the tubular member 35 and an external peripheral surface 40 of the tubular member 35.

The tubular member 35 is formed with an outside diameter that readily permits the tubular member 35 to be telescoped within the tubular hose 27 while having the external peripheral surface 40 thereof disposed closely adjacent the internal peripheral surface 29 of the hose 27 so that once the tubular member 35 is positioned inside the hose 27, the tubular member 35 is held therein by friction and will not readily fall out of the same. The length of the tubular member 35 relative to the length of the hose 27 has been so selected that the ends 36 and 37 of the telescoped tubular member 35 are disposed inboard of the end portions 22 and 23 of the hose 27 so that the end portions 22 and 23 of the hose 27 can comprise cuff ends of the resulting hose construction 20 to readily permit the same to be mounted to any suitable structure as will be apparent hereinafter without interference by the inserted tubular member 35.

The tubular member 35 is formed of any suitable material, such as the metallic material illustrated in the drawings and is corrugated throughout the length thereof, the particular corrugated pattern illustrated in FIGS. 2, 3, 5 and 6 being a uniform continuous helical corrugated pattern that defines alternating external crests 41 and valleys 42 formed in a uniform manner between the ends 36 and 37. However, it is to be understood that the tubular member 35 could have any desired pattern of corrugations throughout the length thereof and the corrugations need not be disposed in a helical manner as the feature desired is to cause the tubular member 35 to be relatively deformable and be adapted to retain the subsequent bent shape thereof.

For example, reference is now made to FIG. 4 wherein another tubular member of this invention is indicated by the reference numeral 35A and parts thereof similar to corrugated tubular member 35 previously described are indicated by like reference numerals followed by the reference letter "A".

As illustrated in FIG. 4, the tubular member 35A is corrugated in a helical manner except that after every third uniform corrugation 41A thereof a noncorrugated section 43 is provided with such pattern being repeated over and over again throughout the length of the tubular member 35A.

Therefore, it can be seen that any desired pattern of uniform, random, or combination of uniform and random corrugations can be utilized in order to render the tubular member 35 relatively bendable into the desired shape thereof and because of the material forming the tubular member 35, the tubular member 35 tends to retain the last bent shape thereof even when the same has been assembled with its respective hose 27 so that the respective hose 27 and tubular member 35 are jointly bent into the desired configuration, such as the configuration illustrated in FIG. 5, and remain in such bent configuration.

Also, it may be found that a strip wound tubular member can be utilized rather than a corrugated tubular member.

In any event, it can be seen that the particular hose construction 20 of this invention is adapted to be bent into the desired shape thereof so as to conform to the particular path required therefor for an engine mounting arrangement, such as the arrangement illustrated in FIG. 1 with the end cuffs 22 and 23 being positioned so that the same will couple to the desired structure and provide a flow path therebetween.

For example, reference is now made to FIG. 6 wherein it can be seen that the end 22 of the hose construction 20 is telescoped onto the radiator horn 24 of a conventional engine radiator 44 and is held thereon by an annular clamp 45 in a manner conventional in the art. Because the end 36 of the tubular member 35 of the hose construction 20 does not extend into the cuff end portion 22, the tubular member 35 does not hinder the use of the clamp 45 in compressing the end portion 22 onto the horn 24 in a conventional manner. In addition, the end 36 of the tubular member 35 can be so spaced from the end 46 of the horn 24 that the end 36 does not interfere with fluid flow into or out of the horn 24 in any manner.

Of course, the other end portion 23 of the hose construction 20 is adapted to be interconnected to its desired structure in a manner similar to the end portion 22 as illustrated in FIG. 6.

Therefore, it can be seen that it is a relatively simple method of this invention to form the hose construction 20 of this invention by first forming the tubular member 35 and then telescoping the same within the hose 27 whereby the resulting hose construction 20 can remain in the substantially straight configuration as illustrated in FIG. 2 until it is desired to bend the same into a particular shape before attaching the end portions 22 and 23 to the desired structure.

For example, it is well known that the number of molded curved hose sizes for replacement automotive, industrial and marine hose applications has grown far beyond what is practical for a parts house or service station to keep in stock, let alone have manufacturers produce in an economical manner. As a result, the hose construction 20 of this invention readily permits the same to be formed by hand into any one of a multitude of desired shapes and be retained in that shape so that the hose construction 20 of this invention can be utilized for many different applications whereby inventory costs for a parts house or service station can be substantially reduced.

Since the wire reinforcing means 33 of the hose 27 of the hose construction 20 previously described will normally prevent collapse of the hose 27 under vacuum conditions therein, it may be found that it is not necessary for the tubular member 35 of this invention to extend all the way to the end cuffs 22 and 23 of the hose 27 but can be located in merely the medial portion of the hose 27 for its shape retention purposes. Nevertheless, because the tubular member 35 can also perform a reinforcing function for the hose 27, it may be found that the hose 27 need not have the wire reinforcing means 33.

Also, while the hose construction 20 of this invention has the tubular member 35 thereof disposed within the flexible hose 27 thereof, it is to be understood that the tubular member of this invention could be disposed on the outside of the hose construction and still perform its shape retaining function.

For example, reference is now made to FIG. 7 wherein another hose construction of this invention is generally indicated by the reference numeral 20B and parts thereof similar to the hose construction 20 previously described are indicated by like reference numerals followed by the reference letter "B".

As illustrated in FIG. 7, the flexible hose 27B is substantially the same as the hose 27 previously described and the tubular member 35B of this invention is substantially the same as the tubular member 35 previously described except that the same has a larger inside diameter so that the same is adapted to be slipped over the flexible hose 27B and have its opposed ends 36B and 37B spaced from the end portions 22B and 23B as illustrated whereby the internal peripheral surface 39B of the tubular member 35B is disposed immediately adjacent the external peripheral surface 30B of the flexible hose 27B and through the friction fit with the hose 27B, the telescoped tubular member 35B will not readily be removed from the hose 27B.

Since the tubular member 35B performs its shape-retaining function in the same manner as the tubular member 35 previously described, it can be seen that it is relatively simple to form the hose construction 20B into the desired shape by merely hand bending the hose construction 20B into that desired shape.

It is also to be understood that while the flexible hoses 27 and 27B of the hose constructions 20 and 20B of this invention each has the body portion thereof formed with a helical corrugation, the hose could be smooth walled and have the tubular member of this invention either disposed within the smooth walled flexible hose or over the same as desired.

For example, another shape retention hose construction of this invention is generally indicated by the reference numeral 20C in FIG. 8 and parts thereof similar to the hose constructions 20 and 20B previously described are indicated by like reference numerals followed by the reference letter "C".

As illustrated in FIG. 8, the tubular member 27C has a smooth internal peripheral surface 29C and a smooth external peripheral surface 30C and the tubular member 35C is disposed within the tubular member 27C as illustrated.

In regard to FIG. 9, another shape retention hose construction of this invention is generally indicated by the reference numeral 20D and parts thereof similar to the hose constructions 20, 20B and 20C previously described are indicated by like reference numerals followed by the reference letter "D".

As illustrated in FIG. 9, the hose construction 20D has the smooth walled flexible tubular member 27D carrying on the outside thereof the tubular member 35D of this invention as the same has an internal diameter that is slightly larger than the external diameter of the tubular member 27D.

In both of the hose constructions 20C and 20D illustrated respectively in FIGS. 8 and 9, it can be seen that the ends 36C, 37C and 36D, 37D of the tubular member 35C and 35D are so disposed that the same are inboard of the respective end portions 22C, 23C and 22D, 23D of the respective hoses 27C and 27D so that the same can be readily interconnected to the desired structure in the same manner as the end portions 22 and 23 of the hose construction 20 previously described.

Therefore, it can be seen that each of the hose constructions 20, 20B, 20C and 20D of this invention is readily adapted to have the same bent into the desired configuration thereof and the respective shape retention tubular members 35, 35B, 35C and 35D thereof will retain that particular hose construction in the bent shape thereof for the reasons previously set forth.

While the shape retention tubular member 35, 35B, 35C or 35D of this invention can be formed in any suitable manner, it is believed that by forming the same as being seamless between the ends thereof, the resulting tubular member will tend to maintain a substantially circular cross-sectional configuration even in the bend areas thereof so that flow through the resulting bent hose construction of this invention will not be retarded by the particular shape of the flow passage through the hose construction thereof.

Thus, it can be seen that this invention not only provides a new shape retention hose construction, but also this invention provides a new method of making such a shape retention hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a shape retention vehicle radiator hose construction comprising a length of flexible tubular hose formed mainly of polymeric material and having opposite end portions and an intermediate body portion that defines internal and external peripheral surfaces of said hose, said end portions comprising mounting cuffs of said hose construction, said body portion being corrugated, and shape retention means carried by just said body portion of said hose and being adapted to generally retain the shape of said hose construction when said hose and its carried shape retention means are jointly bent into a particular shape, the improvement wherein said shape retention means comprises a deformable metallic corrugated tubular member having opposed ends and a continuous sidewall between said ends that is thinner than said body portion of said hose and that defines internal and external peripheral surfaces of said tubular member and corrugations of said body portion of said hose, said hose and said tubular member being telescoped together with one of said surfaces of said tubular member being disposed closely adjacent one of said surfaces of said hose.

2. A hose construction as set forth in claim 1 wherein said external peripheral surface of said tubular member is disposed immediately adjacent said internal peripheral surface of said hose.

3. A hose construction as set forth in claim 1 wherein said internal peripheral surface of said tubular member is disposed immediately adjacent said external peripheral surface of said hose.

4. A hose construction as set forth in claim 1 wherein said body portion of said hose has a helically wound wire reinforcing said body portion.

5. A hose construction as set forth in claim 4 wherein said wire is disposed intermediate said body portion and said tubular member.

6. A hose construction as set forth in claim 1 wherein said tubular member is seamless between said ends thereof.

* * * * *